(12) United States Patent
Hussain

(10) Patent No.: US 7,539,717 B2
(45) Date of Patent: May 26, 2009

(54) LOGARITHM PROCESSING SYSTEMS AND METHODS

(75) Inventor: Zahid Hussain, Ascot (GB)

(73) Assignee: Via Technologies, Inc., Taipei (TW)

( * ) Notice: Subject to any disclaimer, the term of this patent is extended or adjusted under 35 U.S.C. 154(b) by 783 days.

(21) Appl. No.: 11/223,289

(22) Filed: Sep. 9, 2005

(65) Prior Publication Data

US 2007/0061389 A1 Mar. 15, 2007

(51) Int. Cl.
*G06F 1/02* (2006.01)
(52) U.S. Cl. ...................................................... 708/277
(58) Field of Classification Search ................ 708/277, 708/512, 517
See application file for complete search history.

(56) References Cited

U.S. PATENT DOCUMENTS

| 5,184,347 | A | * | 2/1993 | Farwell et al. ............... 370/350 |
| 5,604,691 | A | * | 2/1997 | Dworkin et al. ............. 708/277 |
| 5,933,360 | A | * | 8/1999 | Larson ........................ 708/512 |
| 6,711,596 | B1 | * | 3/2004 | Coleman ..................... 708/277 |
| 2003/0220953 | A1 | * | 11/2003 | Allred .......................... 708/277 |
| 2006/0224648 | A1 | * | 10/2006 | Johnson ....................... 708/277 |

* cited by examiner

*Primary Examiner*—Tan V Mai
(74) *Attorney, Agent, or Firm*—Thomas, Kayden, Horstemeyer & Risley

(57) ABSTRACT

Embodiments of logarithm processing systems and methods are disclosed. The system embodiments described herein include two tables corresponding to various base and derivative functions of a logarithm, with logic configured to access the tables and format and normalize the accessed values to evaluate the logarithm using a standard floating point, fused multiply-add (FMAD) unit.

49 Claims, 10 Drawing Sheets

LOGARITHM PROCESSING SYSTEMS AND METHODS

CROSS-REFERENCE TO RELATED APPLICATION

This application is related to copending, commonly assigned U.S. utility patent application entitled "EXPONENT PROCESSING SYSTEMS AND METHODS" filed on Aug. 2, 2007, and accorded Ser. No. 11/832,689.

TECHNICAL FIELD

The present disclosure is generally related to processing systems, and, more particularly, is related to logarithm processing systems and methods.

BACKGROUND

In graphics and scientific applications, logarithm computations occur frequently. A logarithm of a function can be defined as log(x×y)=log(x)+log(y). A natural logarithm value can be converted to a base 2 logarithm by the equation $$\log_2(x) = \frac{ln(x)}{ln(2)},$$

where x may be a normalized floating-point number such that $x=1.x_0 x_1 x_3 K x_n \times 2^E$. Then $\log_2(x)=E+\log_2(1.x_0 x_1 x_3 K x_n)$, where $\log_2(x)=E+\log_2(1.x_0 x_1 x_3 K x_n) \in [0,1)$.

One mechanism for implementing a logarithm (e.g., $\log_2(x)$) in a processing system, such as a central processing unit (CPU), is through the evaluation of a polynomial. For example, an optimal computation result can be realized by the following 7th order minimax polynomial −3.245537847+(7.133969564+(−7.494129806+ (5.781438731+(−2.985020854+(0.9780947497+ (−0.1839396192+0.1512535671e−1*x)*x)*x)*x)*x)*x)*x, which has a maximum error of 2.919206449e−7. The polynomial method, common on CPUs, may be implemented using seven multiply and accumulate (MAC) operations, with high precision required for the intermediate results of this computation.

Another mechanism for implementing a logarithm (e.g., $\log_2(x)$, where x equals $z_0+z_1$) may be through the use of a Taylor series approximation, such as a $2^{nd}$ order series as shown in equation (1):

$$y = 2^{x_2} = f(z_0) + (z_1 \times f'(z_0)) + \left(\frac{z_1^2}{2} \times f''(z_0)\right) \quad \text{Eq. (1)}$$

A Taylor series approximation is typically implemented using dedicated hardware, as opposed to simply a CPU, since these operations are not common and multiple specialized tables are typically added to the processor. An example implementation of the $2^{nd}$ order Taylor series described above is shown in FIG. 1.

FIG. 1 is a block diagram that illustrates functionality involved in processing a Taylor series approximation. That is, shown are various functional blocks of a processing mechanism 10, the functional blocks representing hardware devices and/or interconnect components (e.g., busses, wires) delineated in FIG. 1 according to the functionality being performed. The processing mechanism 10 includes registers 14 and 46, transfer blocks 20 and 22, lookup tables 24-28 (e.g., tableA 24, tableB 26, and tableC 28), round & truncate block 30, square function block 32, multiply blocks 34 and 36, add blocks 38 and 40, a subtractor block 42, and an interrupt block 44. The components and/or corresponding functionality would be understood by one having ordinary skill in the art, and thus discussion of the same except where noted below is omitted for brevity. The transfer block 20 is designated with an x, which represents variable $z_0$ corresponding to the most significant eight (8) bits of the mantissa in register 14, wherein the top eight (8) bits correspond to address locations for various functions (e.g., base and derivative functions) of $z_0$ located in tables 24-28. The transfer block 22 is designated with an xp, which represents variable $z_1$ (herein also referred to as a least significant bits source operand) corresponding to the remaining fifteen (15) least significant bits of the mantissa in register 14. The register 14 (e.g., data input register) may hold data corresponding to a $\log_2(x)$ function in single precision (e.g., 32-bit) IEEE-754 floating point format, which includes a sign bit, exponent bits (e.g., 8 bits), and fractional or mantissa bits (e.g., 23 bits) in normalized format (i.e., leading one hidden, leading zeroes removed, and exponent scaled accordingly). The tableA 24 corresponds to the base $z_0$ function, tableB 26 corresponds to the first derivative of the $z_0$ function, and tableC 28 corresponds to the second derivative of the $z_0$ function divided by two.

One way to reduce the complexity of the processing mechanism 10 shown in FIG. 1 is to simplify Equation (1). For example, Equation (1) can be rewritten in Horner's form as $$y = f(z_0) + z_1\left(f'(z_0) + \left(z_1 \times \frac{f''(z_0)}{2}\right)\right) \quad \text{Eq. (2)}$$

Rewriting equation (1) as equation (2) eliminates the need for the square function block 32. Thus, the $2^{nd}$ Order Taylor series in Horner's form may be implemented using three table lookups and two multiply-add operations. One exemplary instruction set for achieving the Taylor series implementation for the architecture described in FIG. 1 can be described as follows:

FRAC R4:=Normalize((R0&0x7FFF)|
((((R0&0x7F800000)>>23)−9)<<23)); (1)

LOGTL1 R1:=TableLookup1 [R0&0x007F8000]; (2)

LOGTL2 R2:=TableLookup2 [R0&0x007F8000]; (3)

LOGTL3 R3:=TableLookup3 [R0&0x007F8000]; (4)

FMAD R5:=R2+(R4*R3); (5)

FMAD R6:=R1+(R4*R5); (6)

EXPADD R7:=((R0&0x7F800000)>>23)+R6. (7)

Briefly, instruction line (1) provides an instruction to normalize the inputs. In other words, the hardware described above in association with FIG. 1 performs computations based on IEEE-754 floating point number format. Thus, in instruction (1), the least significant fifteen (15) bits of the mantissa are converted into a normalized floating point number. In instructions (2)-(4), a value in R0 is truncated (quantized) to eight (8) bits. Then, 3-table look ups are performed ($f(z_0)$, $f'(z_0)$, and $f''(z_0)/2$) and stored in registers R1, R2, and R3, respectively.

In instructions (5) and (6), operations corresponding to equation (2) are performed using two floating point, fused multiply-and-add operations (FMAD). In instruction (7), the log of the exponent is added.

Several problems with the above-described architecture and instruction set are evident. For example, instructions (1) and (7) are non-standard on most architectures. Further, a significant number of instructions are required (e.g., seven instructions required). Also, as mentioned above, these operations are typically implemented in a dedicated processing unit, which may result in a low return on investment if the log function is implemented infrequently. It would be desirable to reduce the instruction set and implement such operations in an architecture that provides for frequent hardware utilization.

SUMMARY

Embodiments of logarithm processing systems and methods are disclosed. One method embodiment, among others, comprises performing a first table lookup to provide a full precision formatted base value corresponding to a base function, performing a second table lookup corresponding to a compressed first value corresponding to a first derivative of the base function and a compressed factored second value corresponding to a factored second derivative of the base function, uncompressing the compressed first and factored second values, full precision formatting the uncompressed first and factored second values to provide full precision formatted first and factored second values, normalizing a least significant bits source operand and full precision formatting the normalized least significant bits source operand to provide a full precision formatted least significant bits source operand, first combining the full precision formatted first and factored second values and the full precision formatted least significant bits source operand to form a first result, and second combining the first result and the full precision formatted least significant bits source operand and the full precision formatted base value to compute the logarithm function.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of logarithm processing systems and methods (herein, referred to as a logarithm processing system or systems). Such logarithm processing systems are configured to reduce the amount of dedicated logic devoted to evaluating logarithms (e.g., $\log_2(x)$) and are configured to utilize existing programmable processing units that have standard floating-point fused multiply-add (FMAD) hardware. To achieve this end, one or more logarithm instruction sets or methods are implemented that include "primitive" operations which may be supported in standard FMAD hardware. Additionally, a minimum set of instructions are used such that timing goals of existing processing pipelines are still met. FMAD hardware is exploited by normalizing and full-precision formatting the inputs and configuring the floating point numbers in standardized format, such as IEEE-754 format. Note that reference herein to a full precision formatted values will be understood to include normalized, IEEE-754 format in single-precision, double-precision, or higher precision. Although full precision formatting is disclosed herein in the context of normalized, single-precision, IEEE-754 format, one skilled in the art will understand that double or higher precision format can be included within the scope of the preferred embodiments, such as through the extensions of the size of tables and/or fields.

Certain embodiments of logarithm processing systems comprise two function tables used to evaluate base and derivative functions for a logarithm. Various logic (e.g., hardware, such as counters, wire-OR circuitry, count-leading zero (CLZ) circuitry and/or registers, etc.) are also included to process (e.g., format and/or normalize values) the table outputs and provide the processed outputs to standard FMAD hardware configured to evaluate the logarithm. Compared to conventional systems, such embodiments operate under a reduced instruction set (e.g., three to four instructions versus approximately seven in conventional systems) and avoid or mitigate the use of specialized hardware.

In the disclosure that follows, an exemplary processing environment is described in which one or more logarithm processing systems can be implemented, followed by a description of embodiments for implementing a Taylor series approximation (i.e., logarithm processing system embodiments). Although the disclosure is provided in the context of a computational core for a graphics processing environment, the disclosed embodiments may be incorporated in essentially any processing environment that performs Taylor series approximations to evaluate a logarithmic function or functions. For example, the embodiments described herein may be used in or in conjunction with a central processing unit (CPU), digital signal processor (DSP), among other computational units for a variety of applications.

Figure 1:
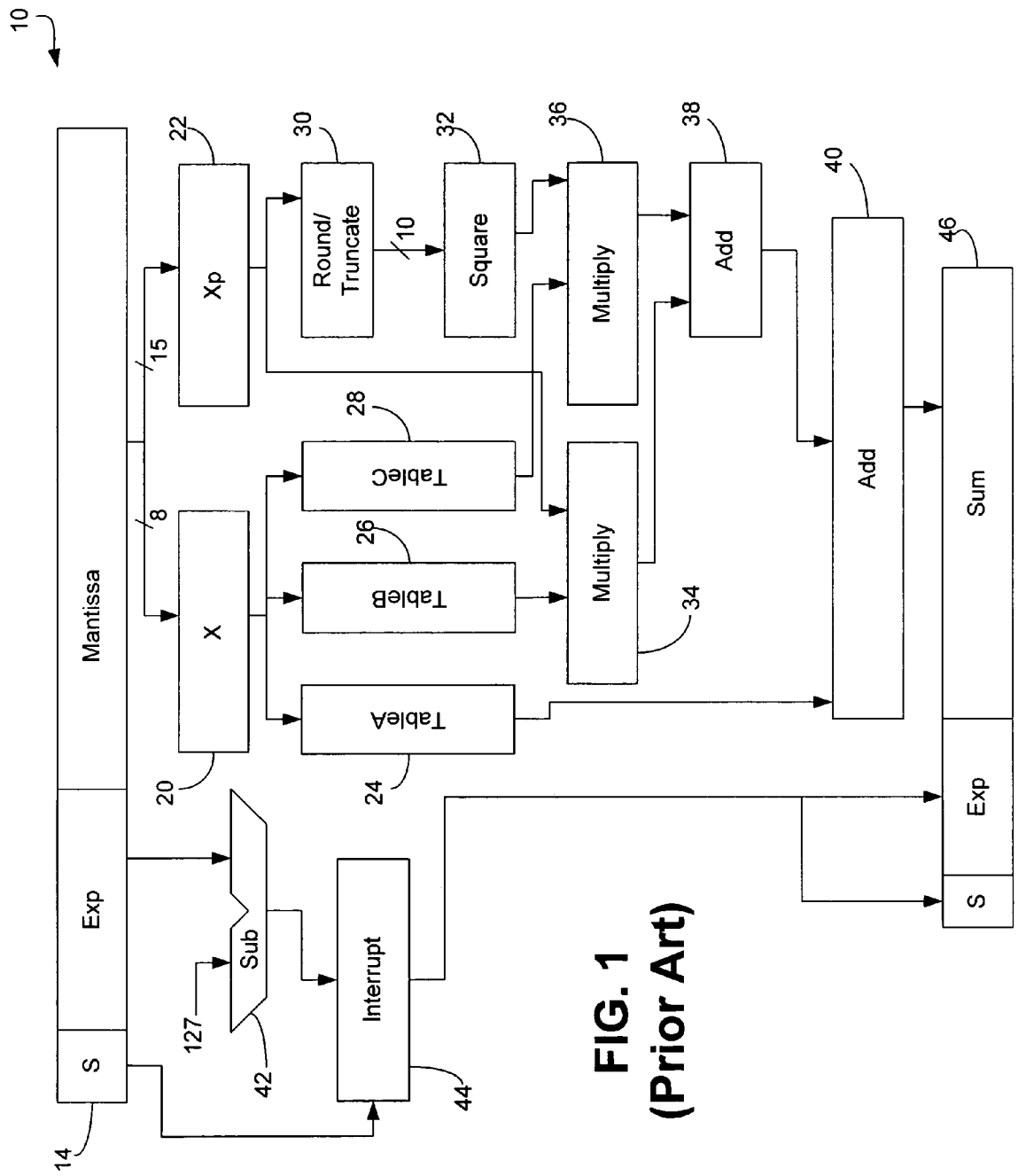
FIG. 1 is a block diagram that illustrates various functionality that may be involved in processing a Taylor series approximation.
Figure 2:
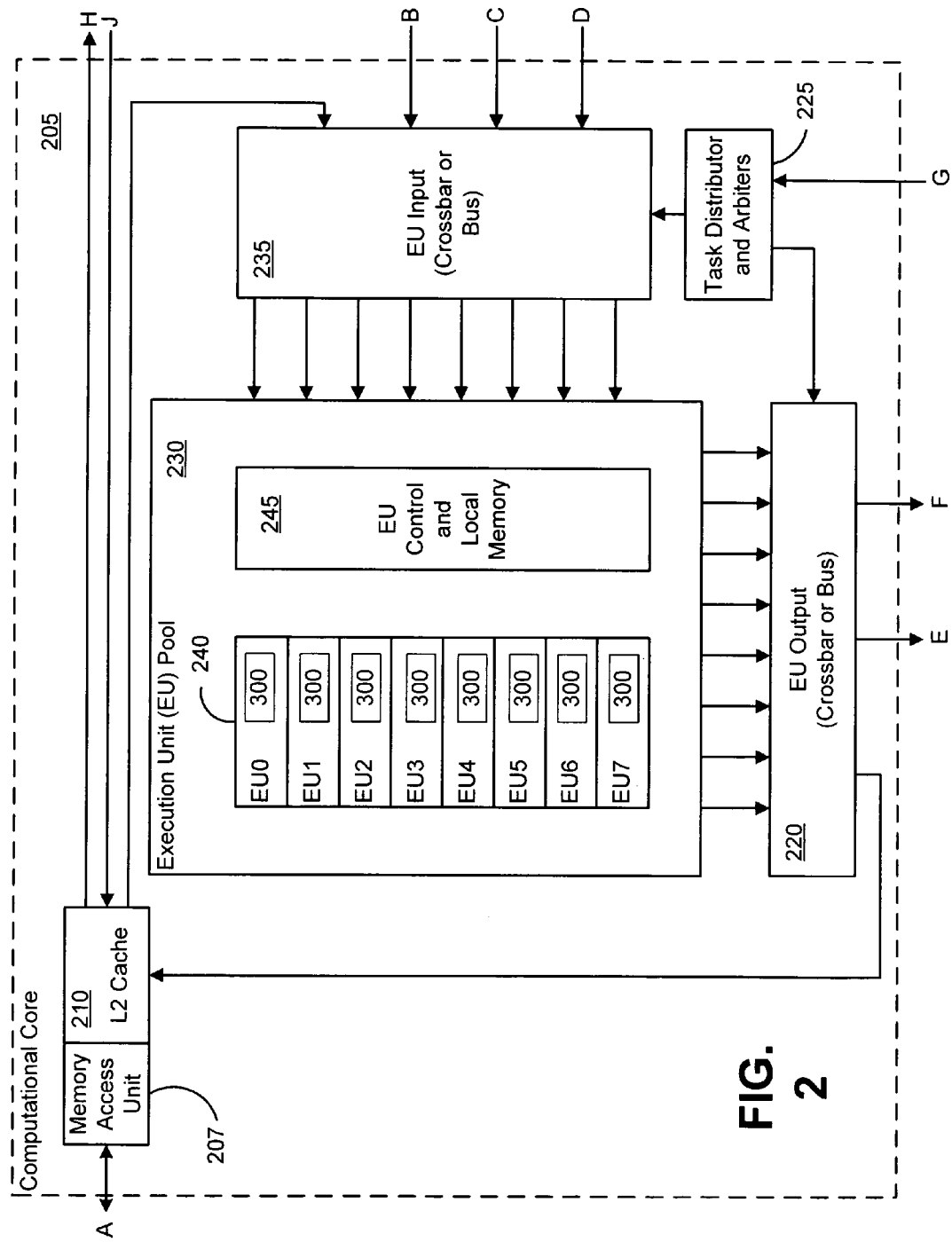
FIG. 2 is a block diagram showing an exemplary environment that includes logarithm processing system embodiments described herein.

FIG. 2 is a block diagram showing a computational core 205 of a graphics processing unit (GPU). While not all components for graphics processing are shown, the components shown in FIG. 2 are sufficient for one having ordinary skill in the art to understand the general functions and architecture related to such graphics processors and logarithm processing system embodiments. As shown in FIG. 2, the computational core 205 comprises a memory access unit 207 that is coupled to a level 2 (L2) cache 210. The memory access unit 207 receives the L2 prefetch and spill from, for instance, a memory interface unit (not shown). The L2 cache 210 receives pre-transform vertices (input J) from an input buffer (not shown) and provides post-transform vertices (output H) to triangle attribute units (not shown).

The computational core 205 also comprises an execution unit (EU) pool 230, which includes multiple execution units (EUs) 240 and an EU control and local memory 245. In one embodiment, each of the EUs 240 includes a logarithm processing system 300 (as described further below), and each of the EUs 240 are capable of processing multiple instructions within a single clock cycle. While eight (8) EUs are shown in FIG. 2 (labeled EU0 through EU7), it should be appreciated that the number of EUs need not be limited to eight, but may be greater or fewer in number for some embodiments.

The computational core 205 further comprises an EU input unit 235 and an EU output unit 220, which are respectively configured to provide the inputs to the EU pool 230 and receive the outputs from the EU pool 230. The EU input unit 235 and the EU output unit 220 may be a crossbar or a bus or other known input mechanisms.

The EU input unit 235 receives the pre-transform vertices (input B) from an input buffer, and provides such information to the EU pool 230 for processing by the various EUs 240. Additionally, the EU input unit 235 receives the pixel packet (input C) and the texel packet (input D) and conveys those packets to the EU pool 230 for processing by the various EUs 240. Also, the EU input unit 235 is configured to receive information from the L2 cache 210 and provide that information to the EU pool 230 as needed. Such information may be provided by the cache 210, crossbar 235, and/or generated locally from a prior operation. The value for which a $\log_2$ computation is performed is preferably located in a register local to the respective EU 240.

The EU output unit 220 receives the output of the EU pool 230, such as the UVRQ and the RGBA. Those outputs, among others, may be directed back to the L2 cache 210, or output (E) from the computational core 205 to a write-back unit (not shown), or output (F) to various texture units (not shown).

The computational core 205 also comprises task distributors and arbiters 225, which receive the tag/synchro from packet assembler (not shown). Using that input, the task distributors and arbiters 225 control the EU input unit 235 and the EU output unit 220. In other words, the task distributors and arbiters 225 control the respective inflow and outflow through the EU input unit 235 and the EU output unit 220. Instruction execution is implemented by hardware residing in each logarithm processing system 300 (corresponding to each EU0-EU7).

FIGS. 3-6 provide illustrations of various functional block diagrams of an embodiment of a logarithm processing system 300 (e.g., 300a, 300b, etc.), which provides for improved processing of a Taylor series approximation to evaluate the logarithm of a function $f(x)$. Note that herein use of the variable "z" is understood to refer to a value for "x" (e.g., of function, $f(x)$) stored in one or more tables. Further note that the blocks or components shown and described for FIGS. 3-6 (and FIGS. 7-8) represent components and/or functionality that may comprise hardware devices, such as arithmetic logic units (ALUs) or other circuitry, interconnect components (e.g., wiring, busses), etc. The logarithm processing system 300 is derived with the following observations in mind:

(a) $f(x) \in (0,1)$, $f'(x) \in (0.722, 1.443)$ and $f''(x)/2 \in (-0.181, -0.722)$. That is, the various functions and derivatives of the logarithm function thereof have values that are within a known range. For example, the first derivative of a $\log_2$ function lies in a range between $\log_2(e)(1.443)$ and $\log_2(e)/2(0.722)$. Evaluation of the second derivative similarly provides for a known range (−0.181 through −0.722).

(b) $z_1$ is smaller than $2^{-8}$ (1/256 or 0.00391). This means that $z_1^2$ is smaller than $2^{-16}$ (1/65536 or 0.0000153). Given such an observation, only the seven (7) most significant bits of an $f''(z_0)/2$ table and the fifteen (15) most significant bits of an $f'(z_0)$ table, both explained below, need to be stored. That is, $f'$ and $f''$ (first and second derivative functions) are bounded within a defined range, as provided above. Also, $z_0$ has eight (8) leading zeroes and $z_1$ has fifteen (15) leading zeroes. Hence, to achieve a 24-bit mantissa, only seven (7) bits corresponding to $f''$ and fifteen (15) bits corresponding to $f'$ need to be stored. Two (2) bits can be stored to indicate the exponent for $f''(x)/2$, and one (1) bit can be stored for the exponent of $f'(x)$.

Given that a table lookup for $f'(x)$ and $f''(x)/2$ both share the same address, two tables may be stored-combined since they will fit into normal 32-bit words. Explained further, in a floating point unit (FPU) in a CPU or DSP, if the FPU is IEEE-754 compliant, then the inputs are normalized numbers. If a table is in this format, an integer or Boolean operation is needed to perform the unpacking and normalization, resulting in slower operation. In such instances for a CPU or DSP FPU, a polynomial approach is favored since only the polynomial coefficients are stored. Thus rather than using three table lookups as in standard conventions (described in the background), two table lookups may be performed: the first (referred to herein as LOGTL1) to look up $f(x)$, and the second (referred to herein as LOGTL2) for a combined look up of $f'(x)$ and $f''(x)/2$ (the latter herein also referred to as a factored second derivative).

From Equation 2, the following equations (3) and (4) can be derived:

$$T = f'(z_0) + \left(z_1 \times \frac{f''(z_0)}{2}\right) \qquad \text{Eq. (3)}$$

and $$y = f(z_0 + (z_1 \times T)). \qquad \text{Eq. (4)}$$

As suggested by Equations 3 and 4, in one embodiment, two FMAD operations are provided. Thus, one embodiment of an instruction set (also referred to herein as Algorithm 1) can be described as follows:

LOGTL1 R1:=TableLookup1 [R0&0x007F8000];     (1)

LOGTL2 R2:=TableLookup2 [R0&0x007F8000];     (2)

CFMAD1 R3:=−NORM(R2 [21:10])+(NORM(R[14:01])*NORM(R2 [9:0]));     (3)

CFMAD2 R4:=R1+(NORM(R0[14:01])*R3).     (4)

Figure 3:
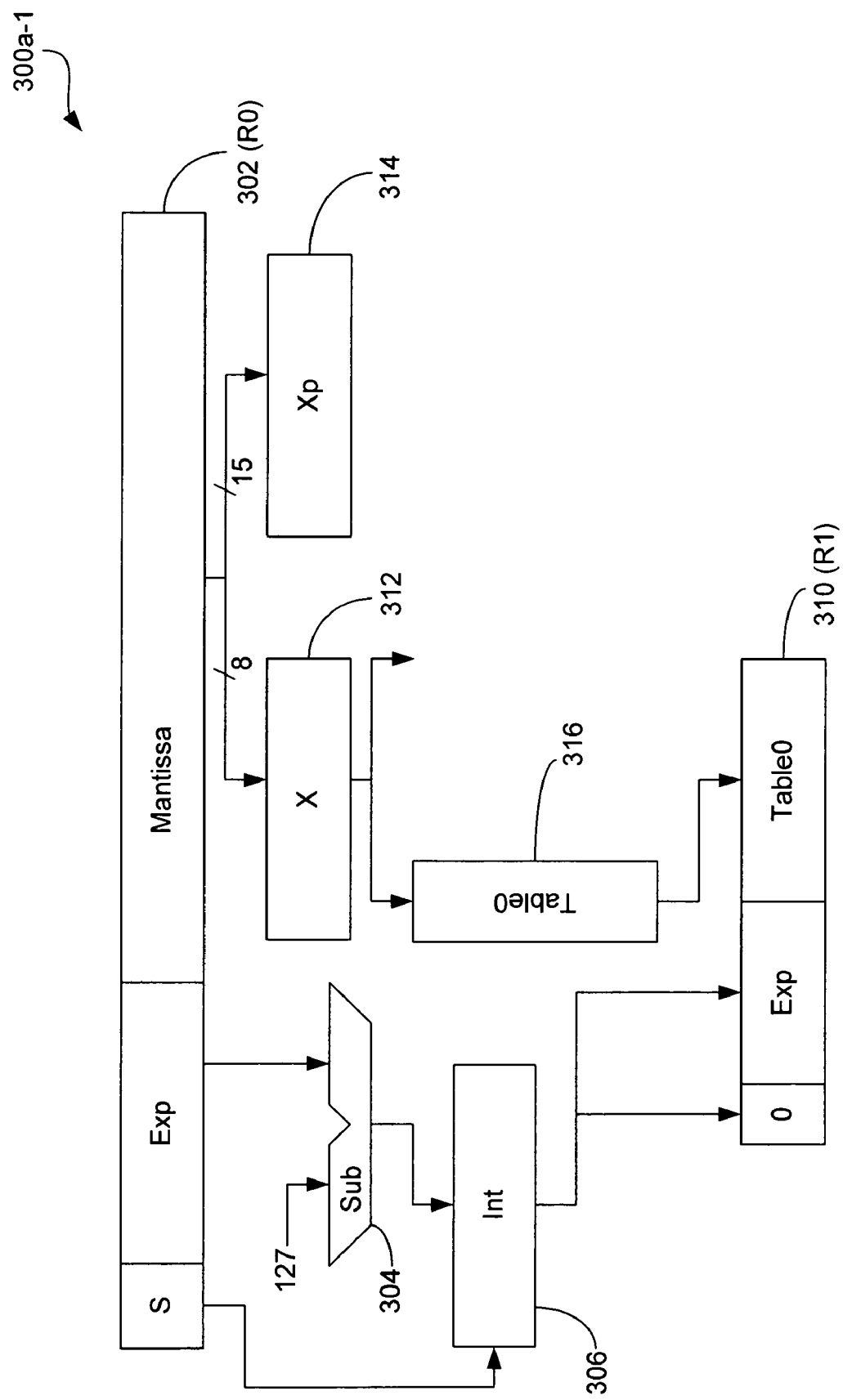
FIGS. 3-6 are functional block diagrams that illustrate an embodiment of a logarithm processing system.

This instruction set is described with the aid of an embodiment of a logarithm processing system 300, the various portions (300a-1 through 300a-4) of which are described in association with FIGS. 3-6. FIG. 3 is a block diagram of a portion of the logarithm processing system 300a-1 that performs a LOGTL1 operation. Note that registers described herein (e.g., R0-R4) represent general purpose registers that may be utilized both as source and destination registers for various operations. As shown, the logarithm processing system 300a-1 includes registers 302 (input register R0) and 310

(R1), subtractor block 304, interrupt block 306, transfer blocks 312 (x) and 314 (xp), and a lookup table0 316 (which corresponds to functionality of an $f(z_0)$ table). The data in the register 302 is configured with a sign bit, exponent bit, and mantissa. In one embodiment, the mantissa comprises twenty-three (23) bits, with the top eight (8) bits [22:15] corresponding to address locations for various functions (e.g., base and derivative functions) of $f(x)$ located in lookup tables, such as table0 316 corresponding to the base $f(x)$ function, $z_0$. The transfer block 314 transfers the bottom fifteen (15) bits of the mantissa (least significant bits source operand) corresponding to the z, function. The $z_0$ function is evaluated and provided to register 310, where the corresponding value is stored in single precision, normalized IEEE-754 format.

Figure 4:
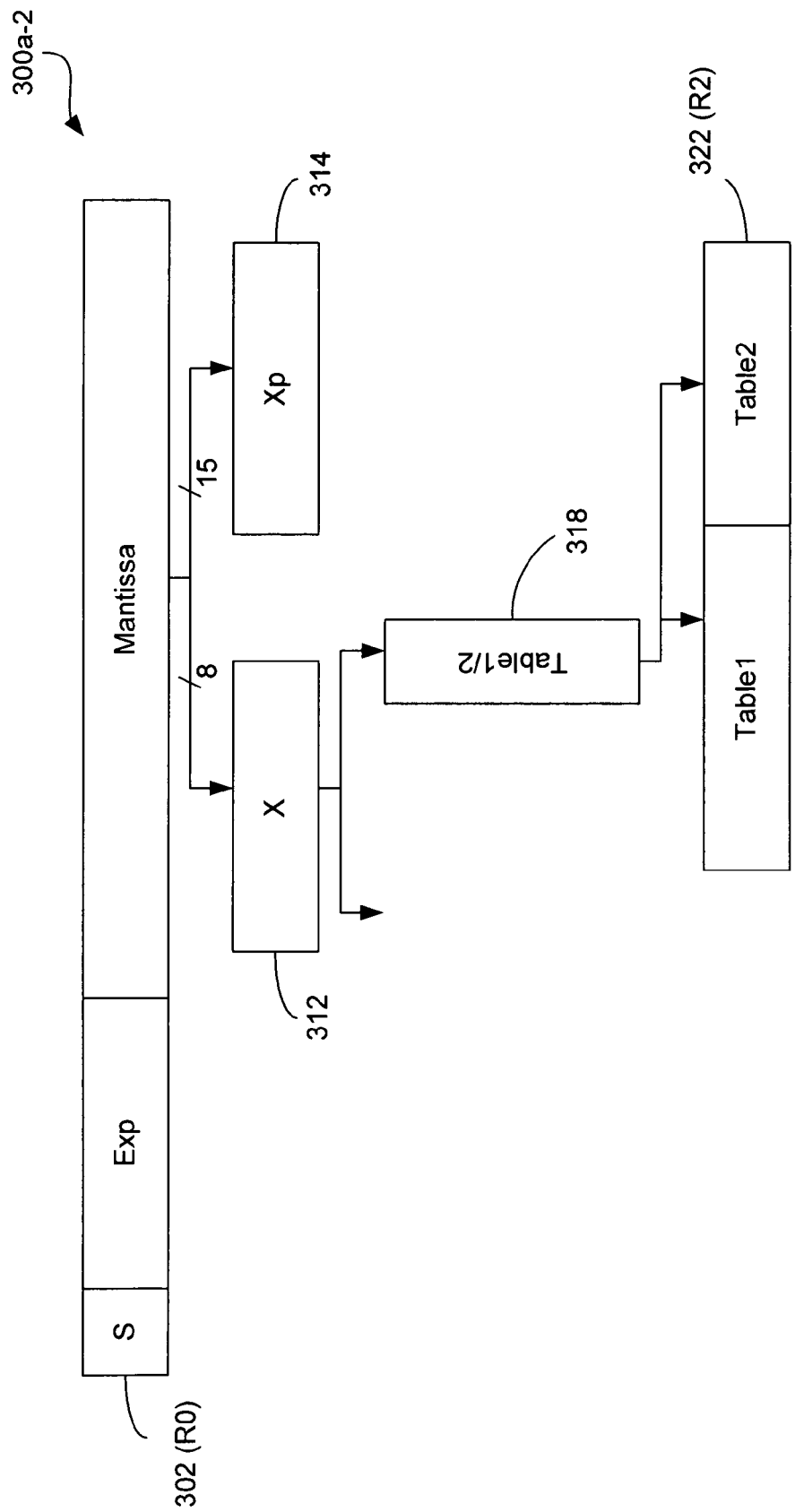

The exponent part from the register 302 is provided to the subtractor block 304, the latter which performs a subtraction of the exponent value and the bias value 127 and provides the difference to the interrupt block 306. The interrupt block 306 receives a sign bit from the register 302 and, based on the sign bit, sets the sign and exponent bits in register 310. For instance, an interrupt may be signaled if one the following events, shown in pseudo code below, occur (with "mant" representing mantissa and "inf" representing infinite):

If (s and exp !=0) result is NaN
If (exp==255 & mant !=0) result is NaN
If (exp==0) result is –inf
If (s !=0 and exp==255 and mant==0) result is +inf FIG. 4 is a block diagram of a portion of the logarithm processing system 300a-2 that performs a LOGTL2 operation. Shown is the input register 302 (R0), destination register 322 (R2), and the transfer blocks 312 and 314, and lookup table1/2 318 (which corresponds to functionality of an $f'(z_0)$ table and $f''(z_0)/2$ table). The divide-by-two operation is built into the $f'(z_0)$ functionality of the table1/2 318, although in some embodiments, such an operation may be implemented separately from the table 318. Given the range of values corresponding to the first and second derivatives, the table1/2 318 and register 322 store values in a compressed non-single precision (non-IEEE-754) format, as explained further below. As indicated above, the top eight (8) bits transferred from the transfer block 312 are used to address the lookup. Responsive to the lookup and evaluation of the first ($f'$) and second ($f''$) derivatives, a twenty-six (26)-bit value is returned to the register 322 (e.g., a 32-bit register) that comprises bits from the table1/2 318. One organization of the bits in register 322 may be that the lower ten (10) bits hold the output of the $f''$ computation and the next sixteen (16) bits hold the output of the $f'$ computation.

As explained above, $f'(x) \in (0.722, 1.443)$, hence functions corresponding to table1/2 318 can be stored in a normalized format, non-single precision format (non-IEEE-754), with bit[22] set to one (1) or zero (0) indicating where a 1 needs to be subtracted from the exponent. For instance, 0.722 is larger than 0.5 but smaller than 1, hence it can be represented as $1.xxxx*2^{-1}$, whereas 1 and larger numbers can be represented as $1.xxx*2^0$. Thus, bit[22] acts as an exponent offset, and the exponent is 127 (normalized) and need not be stored (only one bit needs to be stored). The values can be stored in a compressed format, wherein compressed refers to the storage state wherein only a portion (e.g., fifteen (15) bits for first derivative) of the mantissa of the value corresponding to the derivative and a bit to indicate whether the exponent is 1 or 0 is stored in a normalized format. Thus, a full (e.g., single) precision, IEEE-754 format is not needed for storing the first derivative value.

The factored second derivative function $f''(x)/2 \in (0.181, -0.722)$, which is evaluated in the table1/2 318, can also be stored in a compressed format for similar reasons described above. That is, when a floating point number is normalized, by changing the exponent, it takes the form of $1.xxxx*2^n$. Thus, the exponent has an implicit one for IEEE floating point format and hence does not need to be stored (i.e., the leading one is not stored). Bits[9:7] indicate the value to be subtracted from the exponent. As was discussed for $f'(x)$, $f''(x)/2$ is in a defined range (0.181, -0.722). Note that 0.181 equals $1.0111001*2^{-3}$, and 0.733 equals $1.0111000*2^{-1}$. Thus, what is stored is an exponent offset from 127 (i.e., a value between [1 . . . 3] in bits[9:7]). Thus in one embodiment, the exponent is always 127 (biased) and does not need to be stored in table1/2 318. Also, since in one embodiment $f''(x)/2$ is always negative, the sign does not need to be stored in the table1/2 318. Like the value corresponding to the first derivative, the value corresponding to the factored second derivative is stored in a compressed format, not a full single precision IEEE-754 format.

In some embodiments where LOG2 utilization is relatively low compared to FMAD type of operations, the number of tables required can be minimized by limiting the issue rate. For example as shown in Algorithm 1, four instructions are used. If the issue rate of LOGTL1 and LOGTL2 is limited to one every N cycles, then a single LOGTL1 and LOGTL2 unit can be share over N single-instruction, multiple data (SIMD) units.

Figure 5:
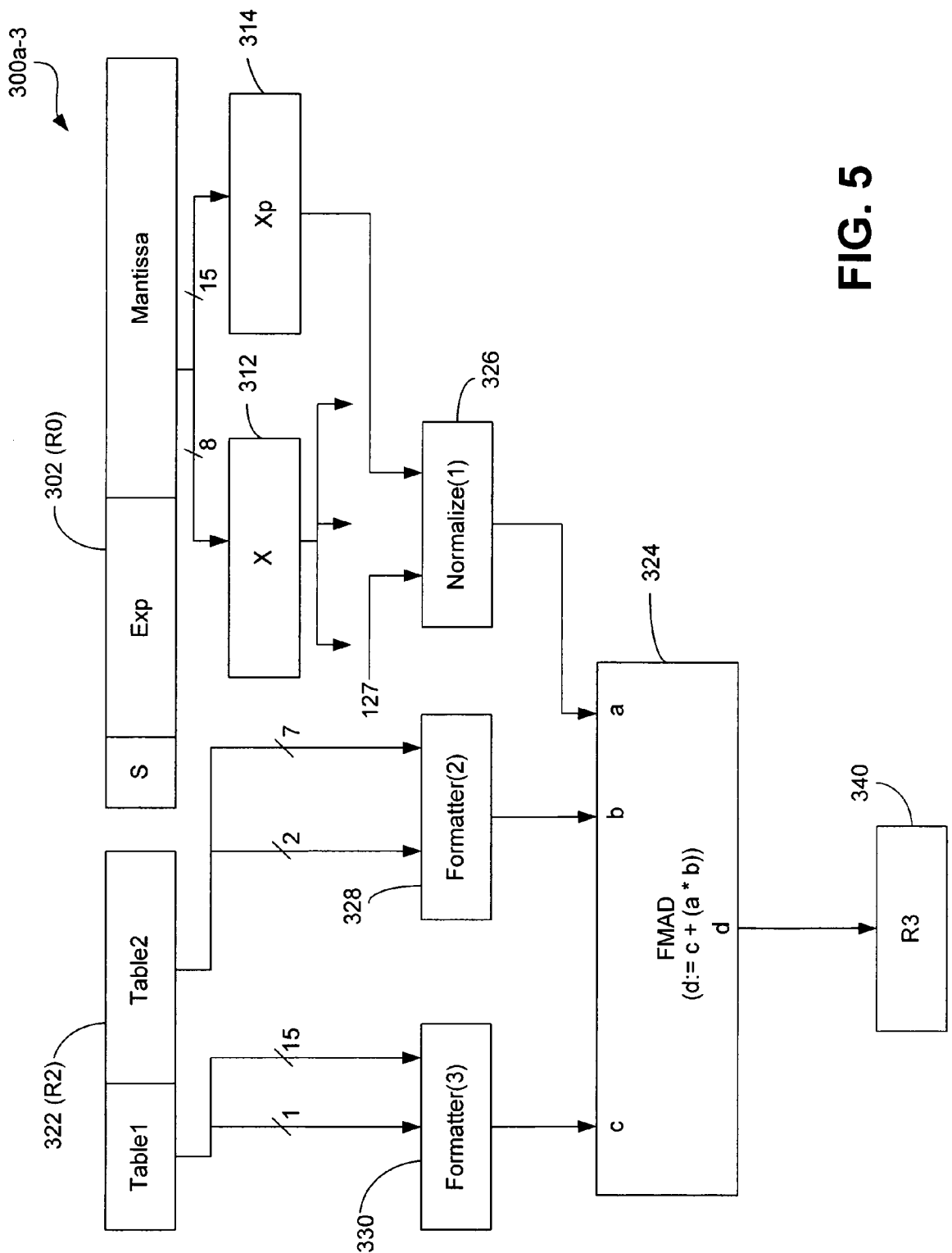

FIG. 5 is a block diagram of a portion of the logarithm processing system 300a-3 that performs a CFMAD1 (modified FMAD) operation. The logarithm processing system 300a-3 includes register 322 (R2, holding compressed values derived from table1/2 318), register 302 (R0), transfer blocks 312 and 314, an FMAD unit 324, formatter(2) block 328, formatter(3) block 330, and normalize(1) block 326. In one embodiment, formatter(2) block 328 and formatter(3) block 330 are substantially identical to each other but different than normalize(1) block 326. The normalize(1) block 326 normalizes and formats (to single precision, IEEE-754 format) the least significant bits source operand from register R0 302 (via transfer block 314). The normalize(1) block 326 can comprise a count leading zero circuit (e.g., a 15-bit countleading-zero (CLZ)) to find the leading one in the register and a shifting circuit (e.g., multiplexing circuit to perform a 15-bit left shift) to shift the value to the left until the leading one falls off. The normalize(1) block 326 can further comprise a counter (e.g., to adjust the value of the exponent, such as subtracting of the number of the left shifts performed) and a wire-OR circuit (e.g., to reconstruct the 32-bit floating point value). Thus, the normalize(1) block 326 can, in one embodiment, comprise logic such as a count leading zero circuit, shifting circuit, counter, and wire-OR circuitry. With regard to CLZ, if CLZ returns a value of N, then the value to be normalized is shifted N+1 and the exponent is decreased by N+1. Note that, as explained above, there is no need to store the leading one since it is implicit in IEEE-754.

Formatter(2) block 328 and formatter(3) block 330 uncompress the values stored in register 322 (R2) and transform the uncompressed values into single precision IEEE-754 format. Formatter(2) block 328 and formatter(3) block 330 hold the exponent offset, with the remainder of the number already in leading one format, and hence obviate the need to provide shift functionality. However, formatter(2) block 328 and formatter(3) block 330 each require the mantissa to be converted into a single precision, IEEE-754 format with the least significant bits set to zero. Formatter(2) block 328 sets the sign bit to 0, and formatter(3) block 330 sets the sign bit to 1. Thus, in one embodiment, each of formatter blocks 328 and 330 can comprise logic such as a wire-OR circuitry and a counter (e.g., to subtract or add an exponent offset, such as 127). Note that the normalize(1) block 426 may comprise a formatter block 328, 330.

Normalize(1) block 326 and formatter blocks 328 and 330 may be implemented in various processing stages depending on the architecture and system needs. For example, in a destination execution pipeline, there is a pipeline stage between operand fetch operations and FMAD execution which can be used for source modification. Thus, such a pipeline stage can also be used for normalization and formatting processing, and the FMAD unit 324 does not need to be modified. In other words, the logarithm processing system 300a-3 can be implemented in a standard FMAD pipeline by adding normalize(1) block 326 and formatter blocks 328 and 330. In addition to register 322 (R2, which holds the output of the LOGTL1 operation (table1/2 318)), the CFMAD1 operation also uses registers R0 302 (via transfer block 314) and R3 340. R0 302 holds the original source operand, and the result of the multiply/add operations is stored in register R3 340.

Each normalize(1) block 326 and formatter blocks 328 and 330 may take two inputs. One input is the value to be normalized/formatted and another input is an exponent adjustment. Normalize(1) block 326 receives the value 127 in 8-bit format. The fifteen (15) bit left shift implemented by the normalize(1) block 326 can occur in parallel to the exponent update. Table1/2 values from register 322 are in a normalized format (e.g., there is always an explicit leading one which is not stored). The biased exponent is 127 and is also not stored. Thus the function corresponding to formatter(2) block 328 and formatter(3) block 330 operations can be implemented as follows:

```
Formatter2/Formatter3(input1, Input2)
    BEGIN
        Output [31]    := 1;
        Output [30:23] := 127−Input2;
        Output [22:0]  := {Input1,0*};
            //fill least significant bits with zero
    END
```

The input of normalize(1) block 326 is not normalized, but rather in a format corresponding to $0.00000000x_{14}x_{13}\ldots x_0$, which is different than the input to formatter(2) block 328 and formatter(3) block 330. In other words, the input to normalize (1) block 326 is treated as non-normalized (e.g., it is zero rather than one) and comprises the leading eight (8) bits after the binary decimal that are zero. The least significant fifteen (15) bits (i.e., $x_{14}x_{13}\ldots x_0$) are to be normalized. Thus, one mechanism for locating a leading one can be implemented as follows:

```
Normalize1 (Input1, Input2)
    BEGIN
        CLZ    := CountLeadingZeros(Input1) +1;
        Sign   := 0;
        EXP    := 127 − Input2 − CLZ;
        MANT   := ShiftLeft(Input1, CLZ);
        Output[31] := Sign;
        Output[22:0] := {MANT, o*};
            //fill least significant bits with zero
    END
```

The output of the formatters and normalizers (326, 328, and 330) are provided to the standard FMAD unit 324, in which the outputs of normalize(1) block 326 and formatter(2) block 328 are multiplied and the result added to the output of formatter(3) block 330 and the sum stored in R3 340.

Figure 6:
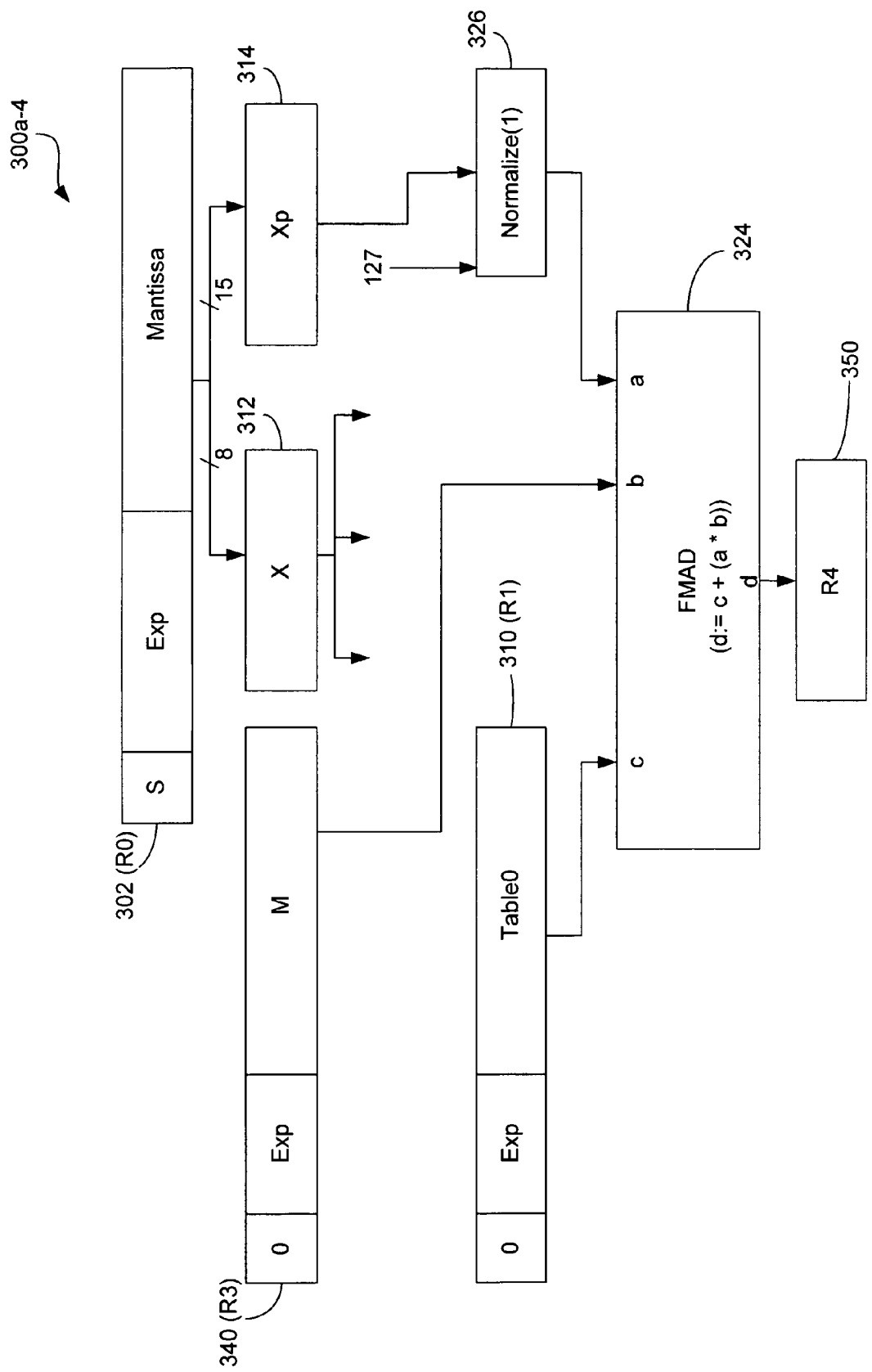

FIG. 6 is a block diagram of a portion of the logarithm processing system 300a-4 that performs a CFMAD2 operation. The logarithm processing system 300a-4 includes registers 302 (R0), 310 (R1), 330 (R3, holding the output of the FMAD unit 324 corresponding to the CFMAD1 operation), and 350 (R4, holding the output of the FMAD unit 324 corresponding to the CFMAD2 operation). The logarithm processing system 300a-4 also includes transfer blocks 312 and 314, the FMAD unit 324, and normalize(1) block 326. The CFMAD2 operation is a three source operand floating-point multiply-add operation. The CFMAD2 operation comprises normalizing the content source input register 302 (R0) at normalize(1) block 326, the latter of which provides an output to the FMAD unit 324 to be multiplied with the content of register 340 (R3). The result of this multiplication is added to the content of source input register 310 (R1), and the result stored in register 350 (R4).

A lower precision $\log_2(x)$ operation may be implemented using the same tables and a linear interpolation ($1^{st}$ Order Taylor series), as shown by Equation 5 below:

$$y = f(z_0) + z_1 \times f'(z_0) \qquad \text{Eq. 5}$$

Figure 7:
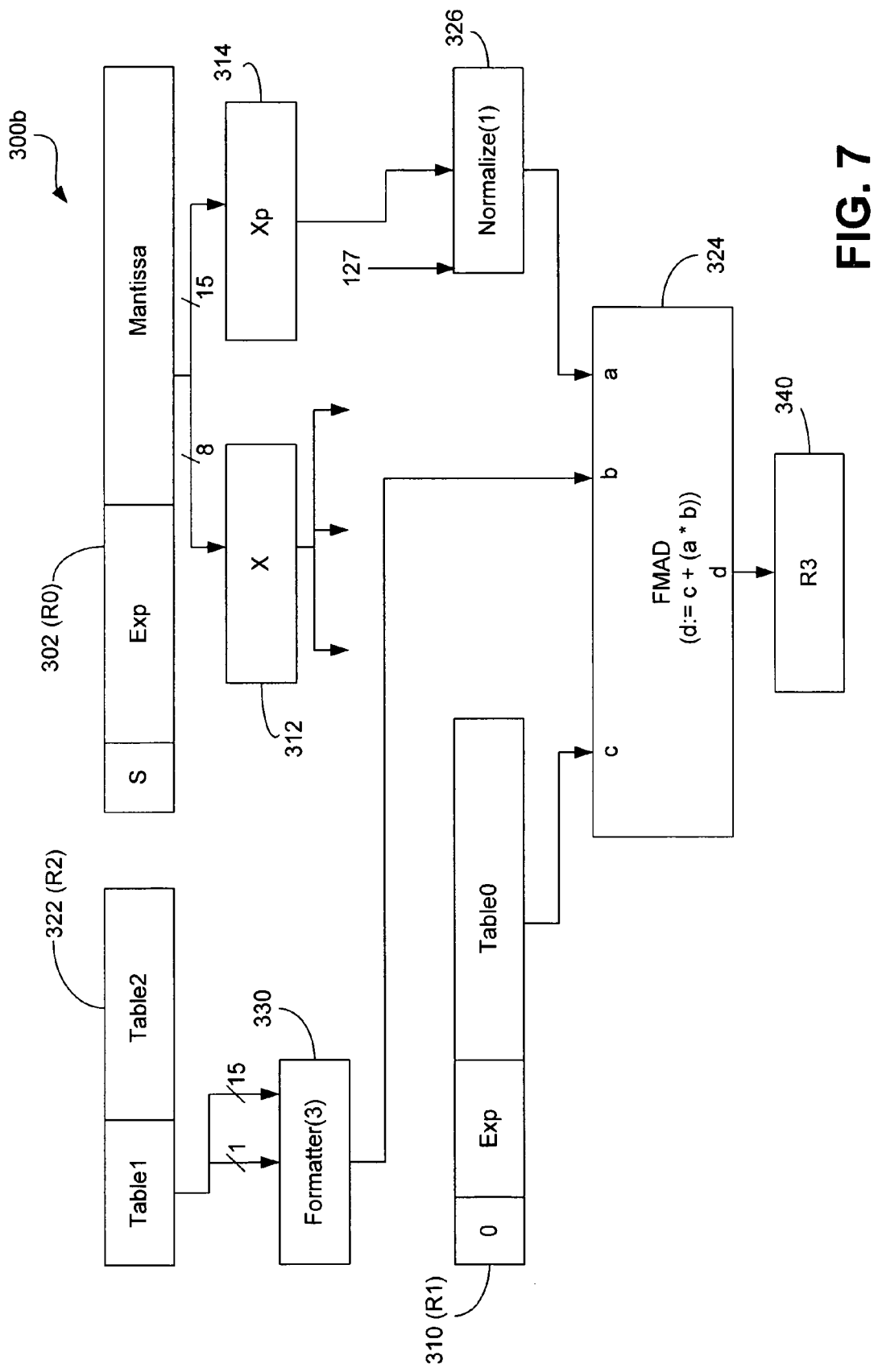
FIG. 7 is a functional block diagram that illustrates an embodiment of a logarithm processing system.

This equation may be implemented in the manner shown in FIG. 7. In particular, FIG. 7 is a block diagram of an embodiment of a portion of a logarithm processing system 300b that implements a CFMAD3 operation. The logarithm processing system 300b includes the same or similar hardware components of the logarithm processing system 300a (300a-1 through 300a-3) shown in FIGS. 3-6. The logarithm processing system 300b includes registers 302, 322, 340, and 310, transfer blocks 312 and 314, normalize(1) block 326 and formatter(3) block 330, and FMAD unit 324. An exemplary instruction set (also referred to herein as Algorithm 2) for controlling operations to the logarithm processing system 300b is as follows:

LOGTL1 R1:=TableLookup1 [R0&0x007F8000]; (1)

LOGTL2 R2:=TableLookup2 [R0&0x007F8000]; (2)

CFMAD3 R3:=R1+(NORM(R0[14:01])*−NORM(R2 [21:10])). (3)

Thus, another embodiment of the logarithm processing system 300b comprises two table lookups and a single FMAD operation. The operation format is similar to the CFMAD2 instruction described above, but two of the source operands are not IEEE-754 normalized, and the result is stored in register R3 340. Thus, an additional instruction CFMAD3 is defined.

Figure 8:
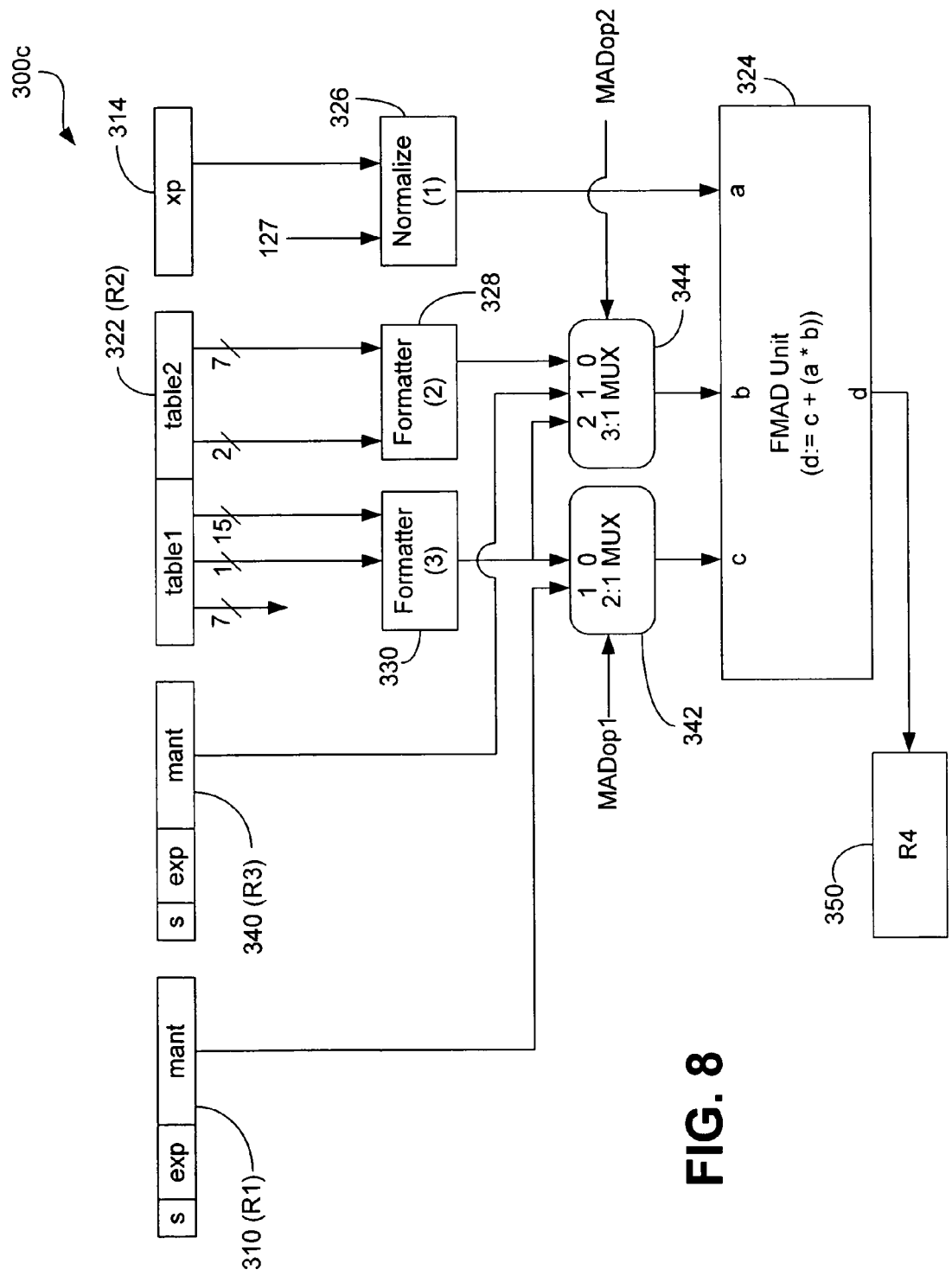
FIG. 8 is a functional block diagram that illustrates an embodiment of a logarithm processing system.

FIG. 8 is a block diagram showing an embodiment of a portion of the logarithm processing system 300c that combines functionality of the above described embodiments (300a and 300b). In particular, logic corresponding to CFMAD1, CFMAD2, and/or CFMAD3 operations is shown with the understanding that the LOGTL1 and LGTL2 operations and components described in association with FIGS. 3 and 4 are also considered part of the logarithm processing system 300c. The logarithm processing system 300c includes register 322 (R2, holding compressed values derived from table1/2 318), register 340 (R3, holding single precision IEEE-754 values corresponding to a first result of a CFMAD1 operation), register 310 (R1, holding single precision IEEE-754 values derived from table0 316), register 302 (R0, not shown, but used to supply the original source operand to transfer block 314), and register 350 (R4) to store the final result of the CFMAD2 operation (or CFMAD3 operation). The logarithm processing system 300c also includes transfer block 314, FMAD unit 324, normalize(1) block 326, formatter(2) block 328 (2) and formatter(3) block 330, and multiplexers 342 and 344 (as explained below).

In operation, the output of formatter blocks 328 and 330 are provided to multiplexers 342 and 344, which in one embodiment are implemented as 2:1 and 3:1 multiplexers, respectively. In particular, the multiplexer 342 receives inputs from formatter(3) block 330 and register 310, and provides an output to the FMAD unit 324 at input c based on control inputs MADop1 and MADop2 as explained below. The multiplexer 344 receives inputs from formatter(2) block 328 and formatter(3) block 330, as well as from register 340. Based on control inputs MADop1 and MADop2, the multiplexer 344 provides an output to input port b of the FMAD unit 324. Finally, the normalize(1) block 326 provides an output to input port a of the FMAD unit 324.

With regard to the CFMAD1 operation (from Algorithm 1 explained above) and based on the control inputs MADop1 and MADop2 to the multiplexers 342 and 344, the output of the normalize (1) block 326 and formatter blocks 328 and 330 are provided to the standard FMAD unit 324, in which the output of the normalizer(1) block 326 and formatter(2) block 328 are multiplied and the result added to the output of the formatter(3) block 330. The result of the CFMAD1 operation is stored temporarily in register 340 (R3).

The CFMAD2 operation is a three-source operand floating-point multiply-add operation. The CFMAD2 operation comprises normalizing the content source input register 302 (R0) at the normalize(1) block 326, the latter of which provides an output to the input port a of the FMAD unit 324 to be multiplied with the content of register 340 (R3). The result of this multiplication is added to the content of register 310 (R1), and the result stored in the register 350 (R4). Operation corresponding to CFMAD3 is enabled through the selection of inputs via the multiplexers 342 and 344 and control inputs MADop1 and MADop2. Multiplexer selection for the CFMAD1, CFMAD2, and CFMAD3 operations can be described using the following operational chart:

|        | MADop1 | MADop2 |
|--------|--------|--------|
| CFMAD1 | 0      | 0      |
| CFMAD2 | 1      | 1      |
| CFMAD3 | 1      | 2      |

Note that the values 0-2 correspond to the input port selections 0-2 shown in multiplexers 342 and 344 in FIG. 8.

Figure 9:
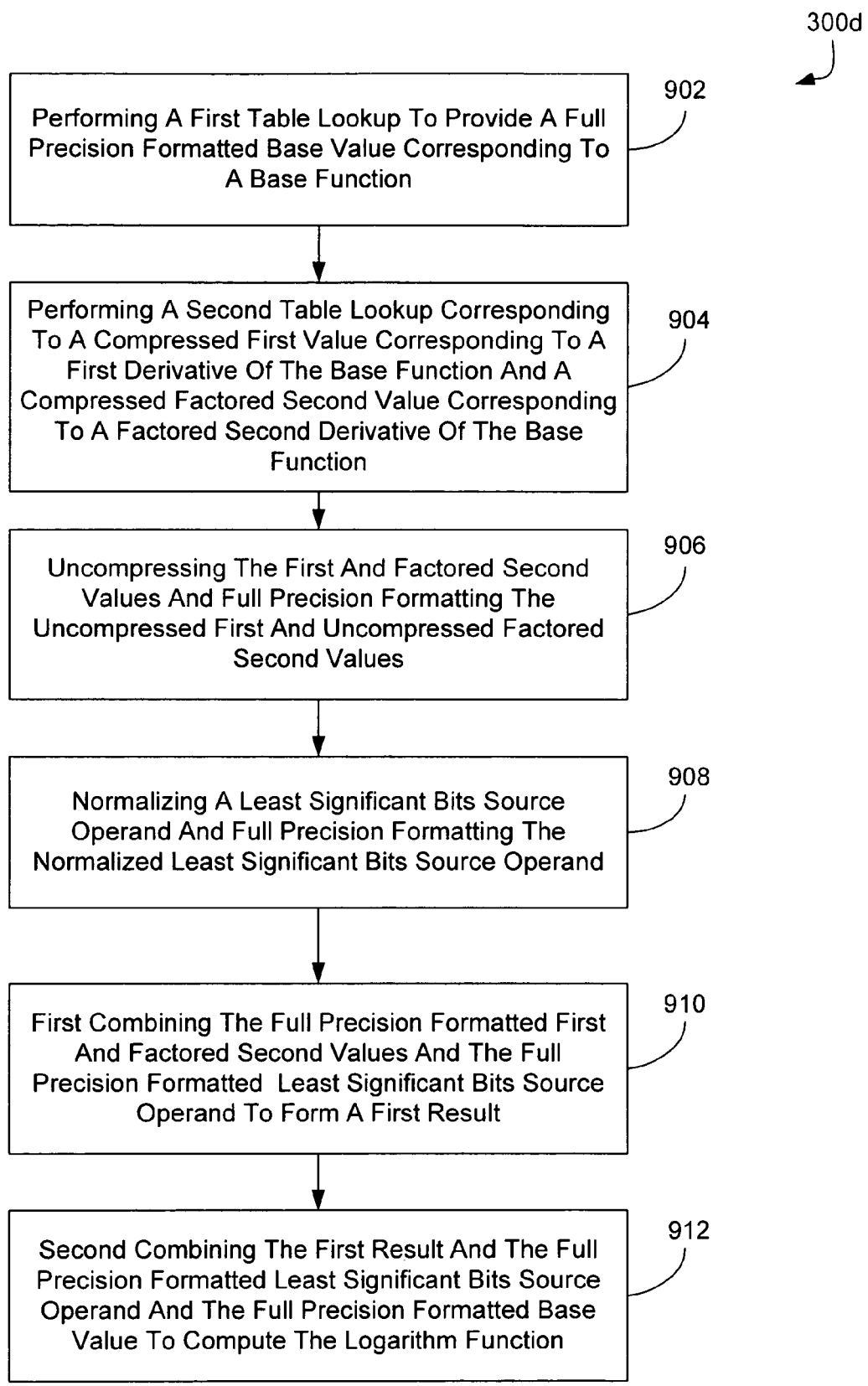
FIG. 9 is a flow diagram that illustrates an embodiment of a logarithm processing method corresponding to a $2^{nd}$ order Taylor Series.

In view of the above description, it will be appreciated that one embodiment of a logarithm processing method 300d may comprise, as illustrated in FIG. 9, performing a first table lookup to provide a normalized, full precision IEEE-754 formatted base function (902), performing a second table lookup corresponding to a compressed first value corresponding to a first derivative of the base function and a compressed factored second value corresponding to a factored second derivative of the base function (904), uncompressing the first and factored second value and full precision (IEEE-754) formatting the uncompressed first and factored second values (906), normalizing a least significant bits source operand and full precision formatting (IEEE-754) the normalized least significant bits source operand (908), first combining the full precision formatted first and factored second values and the full precision formatted least significant bits source operand to form a first result (910), and second combining the first result and the full precision formatted least significant bits source operand and the full precision formatted base value to compute the logarithm function (912).

Figure 10:
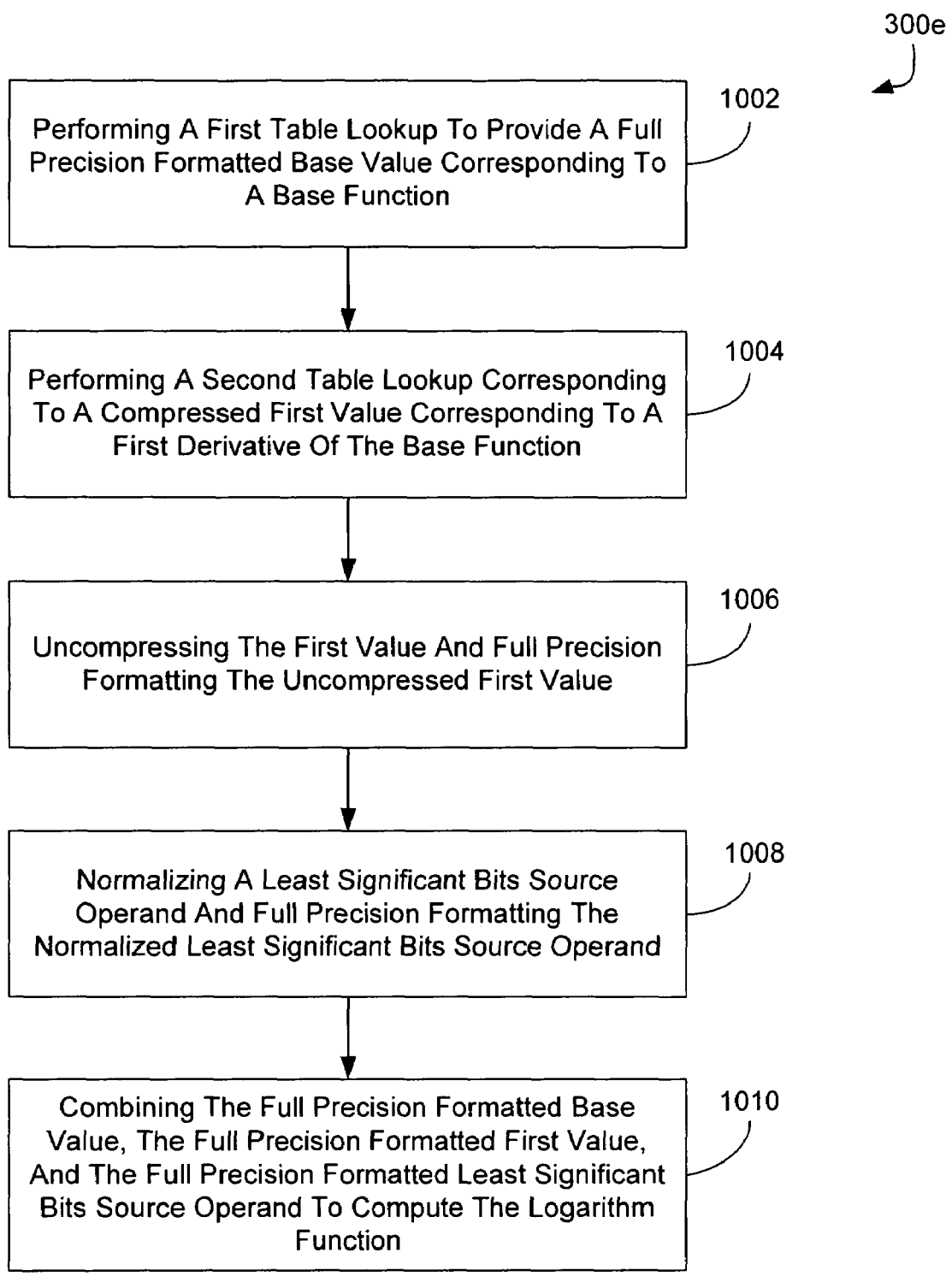
FIG. 10 is a flow diagram that illustrates an embodiment of a logarithm processing method corresponding to a 1st order Taylor Series.

In view of the above description, it will be appreciated that one embodiment of a logarithm processing method 300e may comprise, as illustrated in FIG. 10, performing a first table lookup to provide a normalized, full precision IEEE-754 formatted base value corresponding to a base function (1002), performing a second table lookup corresponding to a compressed first value corresponding to a first derivative of the base function (1004), uncompressing the first value and full precision formatting the uncompressed first value (1006), normalizing a least significant bits source operand and full precision formatting the normalized least significant bits source operand (1008), and combining the full precision formatted base value, the full precision formatted first value, and the full precision formatted least significant bits source operand to compute the logarithm function (1010).

Any process descriptions or blocks in flow diagrams corresponding to FIGS. 9 and 10 should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art.

It should be emphasized that the above-described embodiments, particularly, any "preferred" embodiments, are merely possible examples of implementations, merely set forth for a clear understanding of the disclosed systems and methods. Many variations and modifications may be made to the above-described embodiment(s) without departing substantially from the disclosed principles. All such modifications and variations are intended to be included herein within the scope of this disclosure and protected by the following claims.

What is claimed:

1. A method for computing a logarithm function in a hardware processor, comprising:

performing, in the hardware processor, a first table lookup to provide a full precision formatted base value corresponding to a base function;

performing, in the hardware processor, a second table lookup corresponding to a compressed first value corresponding to a first derivative of the base function;

uncompressing, in the hardware processor, the compressed first value;

full precision formatting, in the hardware processor, the uncompressed first value to provide a full precision formatted first value;

normalizing, in the hardware processor, a least significant bits source operand and full precision formatting the normalized least significant bits source operand to provide a full precision formatted least significant bits source operand; and combining, in the hardware processor, the full precision formatted base value, the full precision formatted first value, and the full precision formatted least significant bits source operand to compute the logarithm function.

2. The method of claim 1, wherein combining comprises computing a first order Taylor series.

3. The method of claim 1, wherein combining comprises multiplying the full precision formatted first value with the full precision formatted least significant bits source operand to form a product, and further comprises adding the full precision formatted base value to the product.

4. The method of claim 1, wherein the base function comprises a first order Taylor series $y=f(z_0)+z_1 \times f'(z_0)$ corresponding to the logarithm function, log 2(x), where x equals $z_0+z_1$.

5. The method of claim 4, wherein the full precision formatted base value corresponds to $f(z_0)$.

6. The method of claim 4, wherein the first derivative of the base function corresponds to $f'(z_0)$.

7. The method of claim 4, wherein the least significant bits source operand corresponds to $z_1$.

8. The method of claim 1, wherein full precision formatting the uncompressed first value to provide a full precision formatted first value comprises converting the uncompressed first value into a normalized IEEE-754 format.

9. The method of claim 1, wherein full precision comprises single precision or higher precision.

10. The method of claim 1, wherein combining is implemented in standard floating point, fused multiply-add (FMAD) hardware.

11. A method for computing a logarithm function in a hardware processor, comprising:
  performing, in the hardware processor, a first table lookup to provide a full precision formatted base value corresponding to a base function;
  performing, in the hardware processor, a second table lookup corresponding to a compressed first value corresponding to a first derivative of the base function and a compressed factored second value corresponding to a factored second derivative of the base function;
  uncompressing, in the hardware processor, the compressed first and factored second values;
  full precision formatting, in the hardware processor, the uncompressed first and factored second values to provide full precision formatted first and factored second values;
  normalizing, in the hardware processor, a least significant bits source operand and full precision formatting the normalized least significant bits source operand to provide a full precision formatted least significant bits source operand;
  first combining, in the hardware processor, the full precision formatted first and factored second values and the full precision formatted least significant bits source operand to form a first result; and
  second combining, in the hardware processor, the first result and the full precision formatted least significant bits source operand and the full precision formatted base value to compute the logarithm function.

12. The method of claim 11, wherein first combining and second combining comprises computing a second order Taylor series.

13. The method of claim 11, wherein first combining comprises multiplying the full precision formatted factored second value and the full precision formatted least significant bits source operand, and further comprises adding a the full precision formatted first value to form the first result.

14. The method of claim 11, wherein second combining comprises multiplying the first result and the full precision formatted least significant bits source operand, and further comprises adding the full precision formatted base value.

15. The method of claim 11, wherein the factored second derivative of the base function comprises a second derivative of the base function divided by two.

16. The method of claim 11, wherein the base function comprises a second order Taylor series described as $y=f(z_0+(z_1 \times T))$ where $$T = f'(z_0) + \left(z_1 \times \frac{f''(z_0)}{2}\right)$$

and wherein the second order Taylor series corresponds to the logarithm function, log 2(x), where x equals $z_0+z_1$.

17. The method of claim 16, wherein the full precision formatted base value corresponds to $f(z_0)$.

18. The method of claim 16, wherein the first derivative of the base function corresponds to $f'(z_0)$.

19. The method of claim 16, wherein the least significant bits source operand corresponds to $z_1$.

20. The method of claim 16, wherein the factored second derivative corresponds to $f''(z_0)/2$.

21. The method of claim 11, wherein full precision formatting the uncompressed first and factored second values to provide full precision formatted first and factored second values comprises converting the uncompressed first and factored second values into a normalized IEEE-754 format.

22. The method of claim 11, wherein full precision comprises single precision or higher precision.

23. The method of claim 11, wherein first combining and second combining are implemented in standard floating point, fused multiply-add (FMAD) hardware.

24. A logarithm processing system in a hardware processor, comprising:
  a first table configured to provide a full precision formatted value corresponding to a base function;
  a second table configured to provide a compressed first value corresponding to a first derivative of the base function;
  logic configured to uncompress and full precision format the compressed first value;
  logic configured to normalize a least significant bits source operand and full precision format the normalized least significant bits source operand; and
  floating point, fused multiply-and-add (FMAD) logic configured to combine the full precision formatted base value, the full precision formatted first value, and the full precision formatted least significant bits source operand to compute the logarithm function.

25. The system of claim 24, wherein the FMAD logic is configured to multiply the full precision formatted first value and the full precision formatted least significant bits source operand to form a product, and further configured to add the full precision formatted base value to the product.

26. The system of claim 25, further comprising multiplexing logic configured to select normalized, full precision IEEE-754 formatted inputs to the FMAD logic.

27. The system of claim 24, wherein the logic configured to uncompress and full precision format the compressed first value comprises counter hardware and wire-OR circuitry.

28. The system of claim 24, wherein the logic configured to normalize a least significant bits source operand and full precision format the normalized least significant bits source operand comprises counter hardware, wire-OR circuitry, count leading zero circuitry, and shifting circuitry.

29. The system of claim 24, wherein the first table and the second table are configured to implement lookups corresponding to a first instruction and a second instruction, respectively.

30. The system of claim 29, wherein the logic configured to normalize and the logic configured to uncompress and full precision format cooperate with the FMAD logic to implement a third instruction in response to the lookups, whereby the logarithm function is computed.

31. The system of claim 30, further comprising a first multiplexer and a second multiplexer coupled between the logic configured to normalize, the logic configured to uncompress and full precision format, storage registers, and the FMAD logic, wherein the first multiplexer and the second multiplexer impose switching to enable selection of a plurality of instructions.

32. The system of claim 24, wherein the base function comprises a first order Taylor series $y=f(z_0)+z_1 \times f'(z_0)$ corresponding to the logarithm function, log 2(x), where x equals $z_0+z_1$.

33. The system of claim 32, wherein the full precision formatted base value corresponds to $f(z_0)$.

34. The system of claim 32, wherein the first derivative of the base function corresponds to $f'(z_0)$.

35. The system of claim 32, wherein the least significant bits source operand corresponds to $z_1$.

36. A logarithm processing system in a hardware processor, comprising:
- a first table configured to provide a full precision formatted base value corresponding to a base function;
- a second table configured to provide a compressed first value corresponding to a first derivative of the base function and a compressed factored second value corresponding to a factored second derivative of the base function;
- logic configured to uncompress the compressed first and factored second values and full precision format the uncompressed first and factored second values;
- logic configured to normalize a least significant bits source operand and full precision format the normalized least significant bits source operand;
- floating point, fused multiply-and-add (FMAD) logic configured to combine the full precision formatted first and factored second values and the full precision formatted least significant bits source operand to form a first result, wherein the FMAD logic is further configured to combine the first result and the full precision formatted least significant bits source operand and the full precision formatted base value to compute the logarithm function.

37. The system of claim 36, wherein the FMAD logic is configured to multiply the full precision formatted factored second value and the full precision formatted least significant bits source operand, and further configured to add the full precision formatted first value to form the first result.

38. The system of claim 36, wherein the FMAD logic is configured to multiply the first result and the full precision formatted least significant bits source operand, and further configured to add the full precision formatted base value.

39. The system of claim 36, wherein the factored second derivative of the base function comprises a second derivative of the base function divided by two.

40. The system of claim 36, wherein the first table and the second table are configured to implement lookups corresponding to a first instruction and a second instruction, respectively.

41. The system of claim 40, wherein the logic configured to normalize and the logic configured to uncompress and full precision format cooperate with the FMAD logic to implement a third instruction in response to the lookups and store the result in a first register.

42. The system of claim 41, wherein the logic configured to normalize and the logic configured to uncompress and full precision format cooperate with the FMAD logic and the first register to implement a fourth instruction, whereby the logarithm function is computed.

43. The system of claim 42, further comprising a first multiplexer and a second multiplexer coupled between the logic configured to normalize, the logic configured to uncompress and full precision format, the first register, and storage registers, and the FMAD logic, wherein the first multiplexer and the second multiplexer impose switching to enable selection of a plurality of instructions.

44. The system of claim 36, wherein the base function comprises a second order Taylor series described as $y=f(z_0+(z_1 \times T))$ where $$T = f'(z_0) + \left(z_1 \times \frac{f''(z_0)}{2}\right)$$

and wherein the second order Taylor series corresponds to the logarithm function, log 2(x), where x equals $z_0+z_1$.

45. The system of claim 44, wherein the full precision formatted base value corresponds to $f(z_0)$.

46. The system of claim 44, wherein the first derivative of the base function corresponds to $f'(z_0)$.

47. The system of claim 44, wherein the least significant bits source operand corresponds to $z_1$.

48. The system of claim 44, wherein the factored second derivative corresponds to $f''(z_0)/2$.

49. A logarithm processing system in a hardware processor, comprising:
- means for providing, in the hardware processor, a full precision formatted base value corresponding to a base function;
- means for providing, in the hardware processor, a compressed first value corresponding to a first derivative of the base function and a compressed factored second value corresponding to a factored second derivative of the base function;
- means for uncompressing, in the hardware processor, the compressed first value and full precision formatting the uncompressed first value;
- means for uncompressing, in the hardware processor, the compressed factored second value and full precision formatting the uncompressed factored second value;
- means for normalizing, in the hardware processor, a least significant bits source operand and full precision formatting the normalized least significant bits source operand; and
- means for combining, in the hardware processor. the full precision formatted first and factored second values and the full precision formatted least significant bits source operand to form a first result, and further combining the first result and the full precision formatted least significant bits source operand and the full precision formatted base value to compute the logarithm function.

* * * * *